Nov. 18, 1969   R. K. LYON   3,479,165
HYDROGEN STORAGE SYSTEM

Filed June 28, 1966   2 Sheets-Sheet 1

R. K. LYON  INVENTOR

BY *Frank A. [signature]*

PATENT ATTORNEY

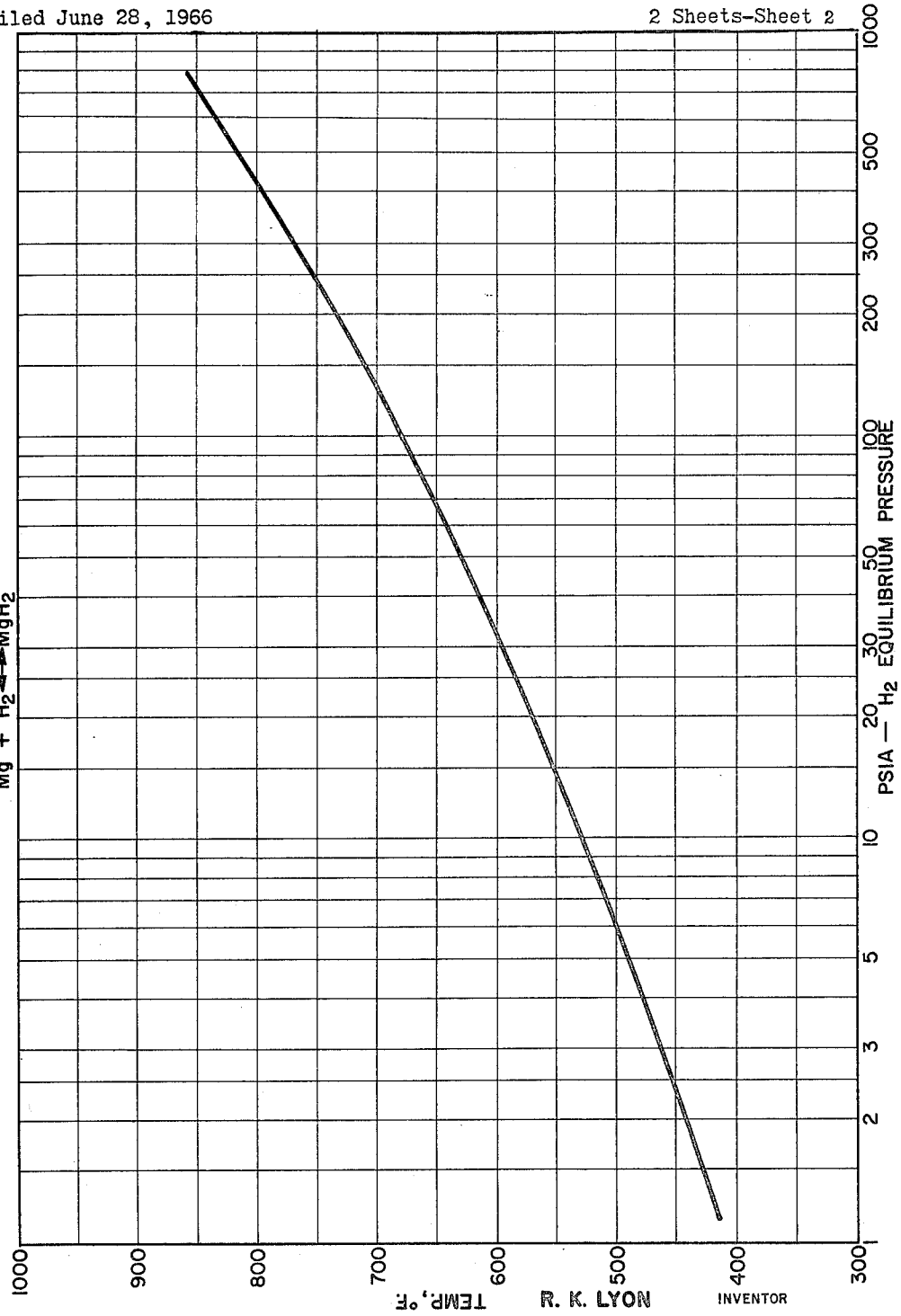

United States Patent Office 3,479,165
Patented Nov. 18, 1969

3,479,165
HYDROGEN STORAGE SYSTEM
Richard K. Lyon, Elizabeth, N.J., assignor to Esso Research and Engineering Company, a corporation of Delaware
Filed June 28, 1966, Ser. No. 561,168
Int. Cl. F17c 5/06
U.S. Cl. 48—190
10 Claims

ABSTRACT OF THE DISCLOSURE

Process and apparatus for storing and supplying hydrogen. In the process, $MgH_2$ is decomposed at temperatures ranging about 530° F.–1200° F. to yield hydrogen at pressures that range from about 15 to 3000 p.s.i.g. The residual Mg, in activated form, can be readily converted back to $MgH_2$ by contacting same with additional or fresh hydrogen. The apparatus comprises a storage container within which is disposed a $MgH_2$ compound, and means are provided for decomposing and delivering hydrogen from the decomposing compound. Means are also provided for recharging by adding fresh hydrogen to the container.

---

Figure 1:
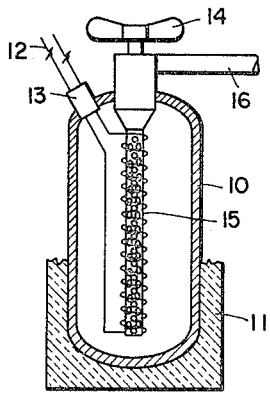

This invention relates to a novel method for storing and supplying hydrogen. More particularly, this invention relates to a rechargeable hydrogen storage and generating system wherein hydrogen is stored as the hydride of magnesium and is supplied, as required, by the thermal decomposition of magnesium hydride, and recharged by reacting the magnesium, formed on decomposition of the hydride with a fresh supply of hydrogen.

The increasing use of hydrogen as an industrial and aerospace material had led to the investigation of new methods for storing and supplying hydrogen. Presently, the two most commonly employed methods for storing hydrogen are high pressure storage in steel cylinders and storage as liquid hydrogen in cryogenic containers. However, each of these methods has several disadvantages. For example, high pressure systems are inherently hazardous and relatively heavy. On the other hand, liquid hydrogen containers, although offering the lightest storage system, suffer from the hazards of handling cryogenic liquids, e.g. costly containers, damage to insulation resulting in large losses of hydrogen, considerable expense involved in liquefaction if hydrogen is to be used as a high pressure gas. Consequently, the search for a lightweight, easily handled, and economic hydrogen storage medium has become widespread. Of primary importance has been the weight of a storage system since transportation cost make up a significant part of the cost of hydrogen.

It has previously been proposed to generate hydrogen for special purposes such as portable fuel cells by the reaction of water with various compounds, e.g. metal hydrides or borohydrides. However, such a method does not lend itself to large-scale hydrogen use where a wide range of pressures is required. Further, hydrogen generation systems employing this method are relatively heavy and are uneconomical in the sense that fresh reactants are required for each hydrogen generating cycle.

It has also been proposed to separate hydrogen from hydrocarbons for recycle in a process at high temperatures (other than by having to cool, to separate and condense the normally liquid materials) by contacting with a molten alkali or alkaline earth metal to form the hydride and then decomposing the hydride at a higher temperature. This process would be uneconomic for the present use because of the low weight percent hydrogen in the hydride and because molten material must be handled. Finally, it is known to prepare special high purity hydrogen in the laboratory by reacting cylinder hydrogen with uranium chips and then thermally decomposing to obtain the pure hydrogen. This process would be uneconomic for commercial hydrogen storage because of the expensive cost of the metal, its heaviness and the low weight percent hydrogen in the hydride. Also relatively high temperatures are required to decompose the hydride. It is noted that although both of these prior art applications operate by means of the reaction $A \rightleftharpoons B + nH_2$ neither contemplates the feasibility of commercial hydrogen storage and transportation as now taught.

In accordance with the present invention, it has now been discovered that magnesium hydride and magnesium hydride alone of all the hydrides affords the basis for an excellent commercial hydrogen storage and transportation system. Thus it meets all of the following criteria: easily reversible, fast reaction rates, side reactions eliminated to maintain purity, high weight percent hydrogen and low compound weight. It is noted that organic compounds containing hydrogen, although light in weight, are not free of side reactions which tend to severely limit the hydrogen purity. Thus, organic compounds also, are not suitable for hydrogen storage and transportation.

In accordance with this invention, magnesium hydride is utilized as a hydrogen source, the hydrogen being supplied by decomposing the magnesium hydride at elevated temperatures. The system may be recharged by reacting a fresh supply of hydrogen with the magnesium formed by the decomposition of magnesium hydride, the fresh magnesium hydride again being available as a source of hydrogen. The $MgH_2$ may be stored in any suitable container. The cycle of magnesium hydride decomposition and synthesis may be repeated indefinitely. Thus, a rechargeable hydrogen storage system, capable of supplying hydrogen at pressures ranging from 0 p.s.i.g. to over 4500 p.s.i.g., is provided in a lightweight, easily transported form.

An integral and essential part of this invention was the additional surprising discovery that the time for resynthesis of $MgH_2$ is significantly shorter than the time for initial synthesis because of the formation of a highly active magnesium resulting from decomposition of the hydride. For example, a 90% magnesium hydride:10% magnesium mixture will decompose at 620° F. and 2.3 atm. to a 10% $MgH_2$:90% Mg mixture in 5.7 hours. Synthesis of magnesium hydride to reform the original mixture, at 620° F. and 5.3 atm. may be accomplished in the same 5.7 hours. By comparison, magnesium turnings under these conditions are inert. For practical synthesis from Mg turnings, the present invention discovered that it was necessary to operate at 750–850° F. and 1000 p.s.i. for several days to get reasonable conversions, e.g. 90%. These conditions would, of course, be prohibitively expensive for each recharging as compared to the present discovery. It is noted that although laboratory preparations of $MgH_2$ were known, it remained for the present applicant to discover these unexpected properties of rapid decomposition and resynthesis and apply these properties to the preparation of an $H_2$ storage system. It was also found that scandium exhibited this highly active form after decomposition of the hydride. However, scandium is extremely expensive and only marginal with respect to its weight percent hydrogen in the hydride and therefore, less desirable than magnesium.

Employing $MgH_2$ as a source of hydrogen allows the design of lightweight storage vessels that greatly decrease the cost of storing and transporting hydrogen. For example, a standard #1A high pressure, e.g. 2000 p.s.i. hydrogen cylinder weighs approximately 136 pounds and has a capacity of 194 s.c.f. of hydrogen. By utilizing this invention, it is now possible to construct an $MgH_2$ storage system weighing the same 136 pounds but with a capacity of 388 s.c.f. of hydrogen, thus providing twice the hydrogen at the same weight. Since transportation costs make up the bulk of hydrogen costs, the process of this invention can effectively reduce transportation costs by a significant amount. Thus, an inexpensive commercially feasible hydrogen storage and transportation system is made available. Furthermore, magnesium hydride can be stored at ambient conditions thus providing advantages over low temperature storage systems. $MgH_2$ is also relatively safe when compared with the other systems. $MgH_2$ although flammable, burns slowly and is far less explosive than free hydrogen.

This invention will be more readily appreciated by a description with reference to the attached drawings. FIGURE 1 is a schematic illustration of a typical $MgH_2$ storage system. FIGURE 2 graphically depicts the hydrogen pressures available during decomposition, as a function of system temperature.

Turning now to FIGURE 1, a container 10, charged with powdered magnesium hydride, is utilized to store hydrogen. Hydrogen is generated by heating the magnesium hydride above its decomposition temperature, 530° F. The container may be of any suitable size or shape. The materials of construction should be able to withstand the operating conditions of the system. An insulating jacket 11 may be integrally constructed with the container or fitted only during heating periods to reduce heat losses. Heat may be supplied in any convenient manner; for purposes of this illustration, heating means are integral with the container, and the heat is supplied by resistance coils 12 which may pass through a regulator 13 for regulating the temperature of the container. At temperatures above 530° F., hydrogen will be generated within the container, pass into a header 14 which may also be a pipe, conduit, etc., through apertures in the header (not shown) and out of the container by way of nozzle 16. A valve 14 may be used to control the flow of hydrogen to and from the container. The supply of hydrogen may be stopped at any time by shutting off the heat supply and closing valve 14. Hydrogen will continue to be generated until the hydrogen pressure approaches the equilibrium pressure for the temperature of the $MgH_2$ and the reaction then stops. As the container cools, the pressure will decrease as the equilibrium hydrogen pressure decreases with decreasing temperature. At room temperature, the hydrogen equilibrium pessure is negligible, i.e. about 0 p.s.i. The system may be started up and stopped as desired. When substantially all of the $MgH_2$ has decomposed, the pressure will drop off sharply and the system will require recharging before further use. Recharging is carried out by supplying hydrogen at nozzle 16 at a pressure somewhat higher than the equilibrium pressure for the temperature of recharging. Since the synthesis of $MgH_2$ liberates heat, it is necessary only to supply a small amount of heat to initiate the reaction.

FIGURE 2 graphically depicts the equilibrium hydrogen pressures for the reaction $MgH_2 \rightleftarrows Mg + H_2\uparrow$ at various reaction temperatures. For example, if equilibrium hydrogen pressures of 200 p.s.i. or 500 p.s.i. are required, reference to FIGURE 2 shows that decomposition temperatures of at least 735° F. or 795° F., respectively, are required.

In order to supply hydrogen, the $MgH_2$ must be heated above its decomposition temperature, i.e. 530° F. Increasing the temperature at which the decomposition is effected serves to increase the pressure at which the hydrogen is supplied. Thus, the decomposition can be effected at temperatures ranging from about 530° F. to about 1200° F., the decomposition temperature to the melting point. The hydrogen pressures that may be generated over this temperature range are 0 p.s.i.g. to about 10,000 p.s.i.g. Normally, however, hydrogen consumers rarely require hydrogen pressures in excess of 600 p.s.i.g. Consequently, the system will find its greatest use in the temperature range of about 530° F. to about 850° F. (at 850° F. the equilibrium hydrogen pressure is about 600 p.s.i.g.). The operating temperature will be determined by two factors, i.e. the desired output pressure, and the desired output rate. In Table I, the operating temperature, operating pressure and discharge time ($t_{DIS}$), i.e. the time to go from 1% Mg-99% $MgH_2$ to 99% Mg-1% $MgH_2$, are correlated. For convenience, the output pressure is given as a fraction of the equilibrium pressure, Peq. For example, according to the table at 735° F. and an output pressure of 270 p.s.i. the time for complete discharge is log $t_{DIS}=0.01$ or just over an hour. However, it will normally be desirable to operate at the lowest temperature which will result in the desired hydrogen output pressure, i.e. the equilibrium pressure for any temperature.

TABLE I

| Peq, p.s.i. | T, °F. | Output pressure | | | | |
|---|---|---|---|---|---|---|
| | | $P_{H_2}{}^1$=0.9 Peq | 0.8 Peq | 0.5 Peq | 0.33 Peq | 0.10 Peq |
| 15 | 515 | 2.70 | 2.40 | 2.00 | 1.88 | 1.75 |
| 30 | 560 | 2.05 | 1.75 | 1.35 | 1.23 | 1.10 |
| 45 | 585 | 1.71 | 1.41 | 1.01 | 0.89 | 0.76 |
| 75 | 621 | 1.25 | 0.95 | 0.55 | 0.43 | 0.30 |
| 150 | 675 | 0.63 | 0.33 | −0.07 | −0.19 | −0.32 |
| 300 | 735 | 0.01 | −0.29 | −0.69 | −0.81 | −0.94 |
| 450 | 773 | −0.36 | −0.66 | −1.06 | −1.18 | −1.31 |
| 750 | 823 | −0.82 | −1.12 | −1.52 | −1.64 | −1.77 |
| 1,500 | 897 | −1.44 | −1.74 | −2.14 | −2.26 | −2.36 |

[1] $P_{H_2}$ as log $t_{DIS}$ in hours.

Since generated hydrogen pressures fall off sharply at low $MgH_2$ concentrations, the system is ready for recharging when substantially all of the $MgH_2$ has decomposed, preferably when the system contains an Mg:$MgH_2$ mole ratio of about 90:10 and more preferably at a mole ratio of 99:1. Recharging may be carried out to completion, i.e. 100% $MgH_2$, if desired, but preferably to an $MgH_2$:Mg mole ratio of at least about 90:10, and more preferably at least about 99:1. (Reaction rates fall off at very low $MgH_2$ or Mg concentrations.)

Recharging is generally carried out by supplying hydrogen at an elevated pressure with initial temperatures somewhat above the temperature for the equilibrium pressure at which the hydrogen is supplied (see FIGURE 2). Since the reaction is exothermic, once part of the reaction mixture is heated to the reaction temperature, the heat liberated will sustain the reaction. Generally, the time for recharging will be dependent upon the pressure at which hydrogen is supplied for recharging at constant heat removal; and, of course, the degree of completion required. As recharging nears completion, the rate will fall off, less heat will be liberated, the temperature gradient will fall and less heat will be removed. Under such conditions heat removal may be kept constant by artificial means, i.e. forced air, water cooling, etc. Hydrogen may be supplied at pressures ranging from about 15–3000 p.s.i.a. and temperatures of 530° F. to about 1200° F.

preferably at pressures below 1000 p.s.i.a., and more preferably at pressures of about 15 to 600 p.s.i.a. and temperatures of 530° F. to 850° F.

Generally, higher pressures will mean shorter recharging times and lower pressures longer recharging times. However, this must be balanced against the extra cost necessitated by constructing containers to withstand high pressures and temperatures. However, recharging will generally be carried out at the highest pressure consistent with a user's required output pressure. Thus, for example, recharging with hydrogen at about 600 p.s.i.a. will require an initial temperature of about 770° F., recharging being substantially complete in about 2 hours.

The hydrogen used to recharge the system need only be of commercial purity. For this reason, certain hydrogen-containing refinery streams may be utilized to supply hydrogen. However, it is necessary that these streams be free of magnesium poisons, i.e. carbon monoxide, carbon dioxide, hydrogen sulfide, and air in amounts greater than 1 mole percent. These components seriously impair the rate of recharging requiring operation at high temperature and pressure. Specifically, refinery streams shown in Table II may be used as inexpensive hydrogen sources for the synthesis of $MgH_2$. Otherwise, these streams would be burned for the fuel value only.

TABLE II

| Stream [1] | Hydrocracker intermediate pressure separator | Hydrocracker high pressure separator |
|---|---|---|
| Composition, mole percent: | | |
| $H_2$ | 68 | 80 |
| $N_2$ | | |
| $CH_4$ | 20 | 13 |
| $C_2$ | 8 | 4 |
| $C_3$ | 1.5 | 1 |
| $C_4{}^+$ | 2.5 | 2 |
| Pressure, p.s.i.a | 650 | 1,500 |
| Approx. mm.s.c.f.d | 2 | 5 |

[1] Streams containing $H_2S$ are scrubbed with Girbotol to eliminate sulfur-containing compounds.

The hydrogen from these streams will react with magnesium under $MgH_2$ synthesis conditions. The remaining stream components, methane, ethane, ethylene, etc., may then be individually recovered by low temperature fractionation and the like, or burned as fuel. Hydrogen supplied by the decomposition of $MgH_2$ formed in this manner will be of a high degree of purity and satisfactory for all hydrogen users.

Magnesium used to prepare the magnesium hydride initially may be of commercial purity and should be in a finely divided form. A particle size ranging from 0.01 to 0.1 inch is preferred although particle sizes outside this range may also be used satisfactorily. Magnesium may be obtained in this form or prepared from sheet or bar by grinding or turning.

The life of the magnesium originally used will be indefinite as long as it is not consumed by irreversible side reactions such as oxidation, reaction with water vapor, etc.

This invention contemplates the use of a container which is constructed to withstand the operating temperatures and pressures of hydrogen generation. In addition, this invention contemplates the use of a lightweight, thin wall container that in a preferred embodiment may be externally supported during hydrogen supply and recharging periods. Such a container will offer greater cost savings in transportation expenses. Further, this invention contemplates a container that is integrally thermally insulated as well as a container wherein thermal insulation is provided only when the contents are being heated. The construction of the container must take in account the effect of hydrogen embrittlement which depends upon the operating temperature and hydrogen partial pressure. Generally, material known as 0.5 Mo steel will be suitable for temperatures up to about 875° F. at maximum hydrogen pressures of about 600 p.s.i. For higher temperatures or pressures material known as 1.0% Cr-0.5 Mo steel will be satisfactory. Examples of materials in the former class are: ASTM A161, A209, and A335. The selection of materials for the container at various operating temperatures may be easily determined by reference to the Nelson curves first published Proc. AP129M (111) 163–72 (1949) by G. A. Nelson and recently revised in Proc. API 45M (111) 190–195 (1965). Austenitic stainless steels are satisfactory for all temperatures and pressures.

Heating the $MgH_2$ can be effected by a variety of means, such as burning hydrocarbon fuels, resistance electrical heating, induction electrical heating, etc. The heating means may be integral with the container or attached only when heat is required. With induction heating the heat is delivered directly to the decomposing magnesium hydride; with the other systems the heat may flow from the heater to the magnesium hydride by conduction and/or natural convection; forced convection may also be used. It is preferred that the heating means be disposed within the bed and where the bed is large, disposed throughout the bed so as to dispose heat throughout the bed. It is noted that this is desirable in view of the poor heat transfer characteristics of $MgH_2$.

This invention is particularly described in the following examples which are intended as illustrative only since modifications and variations therein will be apparent to those skilled in the art.

EXAMPLE 1

Figure 3:
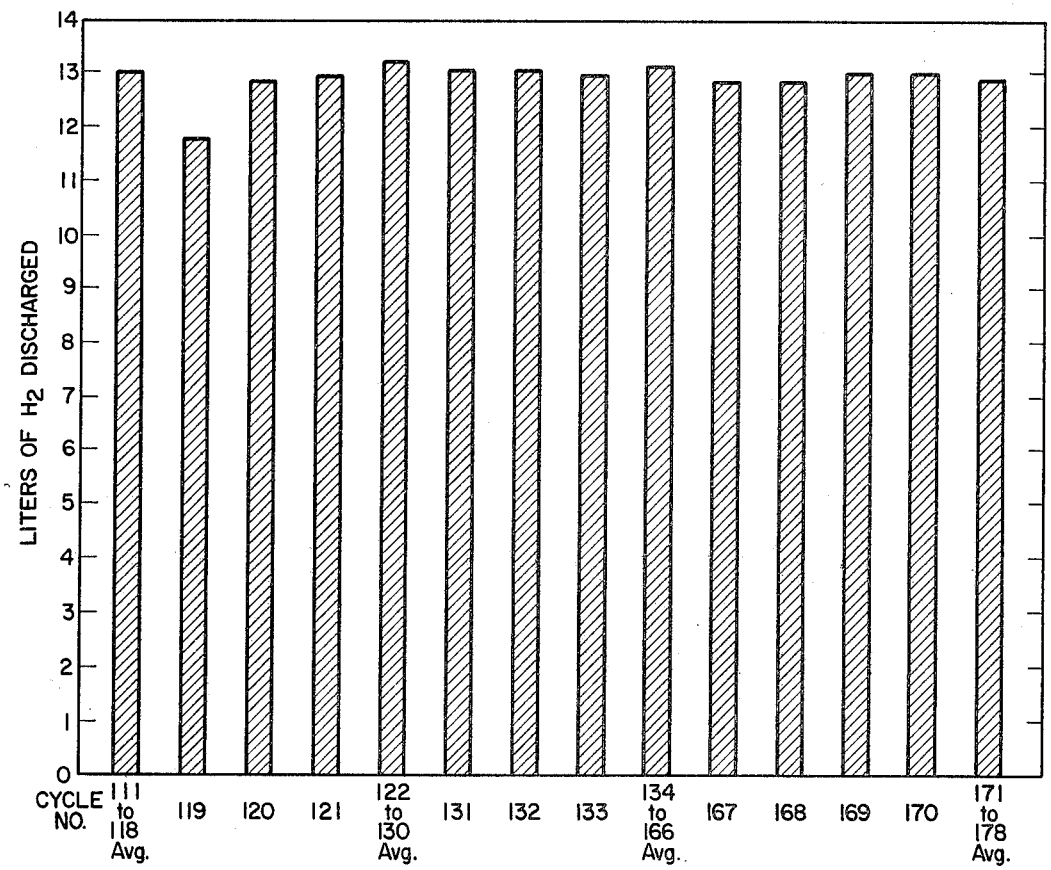

A small steel tube was packed with 20.9 g. of commercial magnesium hydride. The hydride tube is connected to a pair of solenoid valves and heated to 756° F. with an electric furnace. The valves are opened and closed by a tandem timer so that the sample is first subjected to a hydrogen pressure of 460 p.s.i.g. for one hour then is allowed to decompose at 0 p.s.i.g., the output being measured by a wet test meter. The output for the last 68 cycles (out of 178) is shown in FIGURE 3. It is clear from FIG. 3 that after a considerable number of cycles no decrease in hydrogen capacity or deterioration of magnesium could be observed.

EXAMPLE 2

A prototype hydrogen storage unit was built from an aminco high pressure steel bomb using 1300 g. of magnesium hydride. The device operated well between 570° F. and 840° F. and 0 to 1000 p.s.i.g. The observed hydrogen output in a series of runs is given in Table III.

Table III

| Run | Output (liters) |
|---|---|
| 4622–17A | 759 |
| 4622–17B | 715 |
| 4622–19 | 600 |
| 4622–23A | 670 |
| 4622–23B | 789 |
| 4622–26 | 676 |
| 4622–27 | 551 |
| 4622–30 | 899 |
| 4622–34 | 638 |
| 4622–36 | 643 |
| 4622–40 | 877 |
| 4622–44 | 833 |

EXAMPLE 3

It is often observed that gas flow through fine powders can be very slow, especially if the flow geometry is such as to cause powder packing. To demonstrate that this is not a problem in the magnesium hydride system, experiments were done with 16.8 g. of $MgH_2$ packed in a 24" steel tube, 5/16" ID, vertically mounted. Hydrogen was admitted at the top and allowed to exit at the bottom. This geometry is the least favorable arrangement for gas flow. Nevertheless, the system was observed to operate at constant capacity for 73 cycles.

What is claimed is:

1. A method for storing and supplying hydrogen from a rechargeable source which comprises utilizing $MgH_2$ as the hydrogen source, substantially decomposing the $MgH_2$ at temperatures ranging from above about 530° F. to about 1200° F. to produce hydrogen, and recharging by reacting the Mg formed by decomposition of the $MgH_2$ with hydrogen supplied at a pressure in excess of 15 p.s.i.a.

2. The method of claim 1 wherein the hydrogen is produced at pressures of at least 15 p.s.i.g.

3. The method of claim 1 wherein the decomposition is carried out until an $Mg:MgH_2$ mole ratio of about 90:10 is reached.

4. The method of claim 1 wherein the recharging is carried out until an $MgH_2:Mg$ mole ratio of about 90:10 is reached.

5. The method of claim 1 wherein the hydrogen for recharging is contained in a gaseous stream consisting essentially of hydrogen and gases inert with respect to magnesium.

6. The method of claim 1 wherein recharging is carried out with hydrogen containing streams at a pressure ranging from about 15 to 3000 p.s.i.a.

7. Apparatus for storing and supplying hydrogen from a rechargeable source which comprises:
 a container,
 a bed of finely divided particles consisting essentially of Mg and $MgH_2$ disposed within said container and at least partially filling the container from the bottom upward,
 a conduit attached to said container to allow the supply of hydrogen to and from said container,
 means attached to said container for controlling the supply of hydrogen to and from said container,
 means disposed within and extending to the bottom of the bed for heating said $MgH_2$ above its decomposition temperature for supplying hydrogen, and
 means for supplying hydrogen to said container for recharging and reforming said $MgH_2$, said container being constructed to withstand the temperatures and pressures produced during the supply of hydrogen to and from said container.

8. Apparatus of claim 7 wherein the container is constructed of material to withstand hydrogen pressures of below 1000 p.s.i.a.

9. Apparatus of claim 7 wherein the container is constructed of 0.5% Mo steel to withstand temperatures of up to about 875° F. and hydrogen pressures of below about 600 p.s.i.a.

10. Apparatus of claim 7 wherein the heating means disposed within the bed of $MgH_2$ is an elctrical resistance element.

References Cited
UNITED STATES PATENTS

| | | | |
|---|---|---|---|
| 2,864,671 | 12/1958 | Mohlman | 48—196 XR |
| 2,768,061 | 10/1956 | Cook et al. | 23—204 XR |
| 3,030,184 | 4/1962 | Faust et al. | 23—204 |
| 2,994,587 | 8/1961 | Vose | 23—204 |

MORRIS O. WOLK, Primary Examiner

J. D. OLSEN, Assistant Examiner

U.S. Cl. X.R.

23—204; 48—179, 174